United States Patent [19]

Henslee et al.

[11] 4,400,431

[45] Aug. 23, 1983

[54] MAGNESIUM ALUMINUM SPINELS

[75] Inventors: Walter W. Henslee, Lake Jackson; John S. Lindsey, Houston; Stanley J. Morrow, Clute, all of Tex.; John N. Periard, Bay City, Mich.; Charles R. Whitworth, Plymouth, Wis.

[73] Assignee: The Dow Chemical Company, Midland, Mich.

[21] Appl. No.: 299,430

[22] Filed: Sep. 4, 1981

Related U.S. Application Data

[63] Continuation-in-part of Ser. No. 184,189, Sep. 4, 1980, abandoned.

[51] Int. Cl.$^3$ .......................... B32B 5/16; B32B 9/04; C01F 5/00; C01F 7/02
[52] U.S. Cl. .................................... 428/402; 423/593; 423/594; 423/595; 423/596; 423/600; 428/446; 428/689; 501/117; 501/120; 501/126; 501/127; 501/132
[58] Field of Search ...................... 428/402, 446, 689; 423/600, 593, 594, 595, 596; 501/120, 117, 126, 127, 132

[56] References Cited

U.S. PATENT DOCUMENTS

| | | | |
|---|---|---|---|
| 2,618,566 | 11/1952 | Robinson | 106/62 |
| 2,805,167 | 9/1957 | McCreight et al. | 106/62 |
| 3,300,277 | 1/1967 | Schenck et al. | 423/600 |
| 3,323,992 | 6/1967 | Schenck et al. | 423/600 |
| 3,516,839 | 6/1970 | Bruch | 106/62 |
| 3,530,209 | 9/1970 | Ho | 106/62 |
| 3,531,308 | 9/1970 | Bagley | 106/62 |
| 3,544,266 | 12/1970 | Palmour et al. | 106/62 |
| 3,565,646 | 2/1971 | Housch | 106/62 |
| 3,567,472 | 3/1971 | Bratton | 106/62 |
| 3,796,792 | 3/1974 | Miyata et al. | 423/595 |
| 3,879,525 | 4/1975 | Miyata et al. | 423/600 |

OTHER PUBLICATIONS

Bratton, R. J., "Initial Sintering Kinetics of MgAl$_2$O$_4$," Journal of The American Ceramic Society, vol. 52, No. 8, 1969, pp. 417–419.

Bratton, R. J., "Coprecipitates Yielding MgAl$_2$O$_4$ Spinel Powders", Ceramic Bulletin, 48, No. 8, pp. 759–762, 1969.

Bratton, R. J., "Characterization and Sintering of Reactive MgAl$_2$O$_4$ Spinel", Ceramic Bulletin, 48, No. 11, pp. 1069–1075, 1969.

Bakker, W. T., "Reactive Magnesia Spinel, Preparation and Properties", Ceramic Bulletin, 46, No. 11, pp. 1094–1097.

*Primary Examiner*—Mark Bell
*Attorney, Agent, or Firm*—G. R. Baker

[57] ABSTRACT

Several methods are set forth for preparing polymetallic spinels by coprecipitating two or more metal compounds in a proportion to provide a total of eight positive valences when combined in the oxide form in the spinel crystal lattice. The methods disclosed require coprecipitation of the metals in the hydroxide form or convertible to the hydroxide-oxide form, calcining the coprecipitate, and finally sintering the calcined material at about one-half its melting point or greater, thereby forming a spinel which has a density of greater than 50 percent of the theoretical density of spinel crystal. Also disclosed are techniques for preparing spinels having more than two metals incorporated into the spinel lattice, as well as a separate oxide phase associated with the spinel crystallites, and slipcasting compositions.

25 Claims, No Drawings

MAGNESIUM ALUMINUM SPINELS

CROSS REFERENCE TO RELATED APPLICATION

This application is a Continuation-In-Part of copending application Ser. No. 184,189, filed Sept. 4, 1980 now abandoned.

BACKGROUND OF THE INVENTION

Spinels are well known metal oxides of specific structural configuration having a generic formula $M_3O_4$ where M represents the same or different metal elements having different valences whose sum of products of the valence times the number of atoms of each element having that valence equal, preferably eight, but may vary up to a few percent excess or deficiency of the metal ion relationship from eight. Exemplary of the common formulae are, e.g., $MgAl_2O_4$, and $ZnCo_2O_4$ where the sum of the product of the positive elements valence times the number of atoms of each valence equals eight. Exemplary of imbalanced stoichiometry, excess and deficient atom structures, are, e.g., $Mg_{0.9}Fe_{0.11}Al_2O_4$ and $Ni_{0.2}Co_{0.79}Co_2O_4$ respectively.

Most prior art techniques used commercially for preparing ceramic spinels employ the fusion technique of the metal oxides. This technique is not wholly satisfactory for the preparation of ceramic spinels because the metal atoms do not completely form into the spinel lattice structure; that is, some metal atoms form a segregated oxide phase admixed with the spinel lattice structure and once formed by fusion the crystals are not amenable to shaping by pressure and sintering without the aid of binders which may be detrimental to acid and/or base resistance and physical properties of the finished product. Organic binders in ceramics made in this way make the body relatively porous when they are removed during or after shaping. Segregated ceramic binders may weaken the body because they are the site of differential expansion and contraction and/or chemical attack.

The prior art also recognized the phenomena of spinel formation being a physio-chemical reaction based on thermal conditions such that, regardless of the ratio of the metals, some spinel lattice would form at the correct temperature, physical and chemical conditions, albeit those atoms not forming a spinel lattice structure remain as segregated phases of the metal oxides. The spinel shapes which are commercially available usually have been prepared from spinels produced from starting materials containing impurities or one or more segregated metal oxides phases and thus are relatively poor with respect to their physical properties, e.g., tensile strength, acid and/or base resistance and porosity.

Numerous patents and scientific literature have been published disclosing different techniques for preparing spinels (esp. $MgAl_2O_4$). Most procedures employ metal oxides or oxidizable compounds, both of which are converted to a spinel by firing or fusion with or without pressure.

In some patents a magnesium compound and an aluminum compound are mixed to give the requisite molecular constitution, are wet ground and mixed, and fired at temperatures up to 3,000° F. (ca 1660° C.) as for example, in U.S. Pat. No. 2,618,566 or shaped before firing into pebbles as in U.S. Pat. No. 2,805,167.

Others use pure magnesia and alumina mixtures which are then fired at 2150° C. and cooled slowly overnight, (e.g. U.S. Pat. No. 3,516,839). Still others mix alumina with magnesium nitrate, dry fire on a schedule to 1400° C., and then grind to obtain a powder, (e.g. U.S. Pat. No. 3,530,209). Another technique follows the fusion route of magnesium nitrate hexahydrate and ammonium aluminum sulfate dodecahydrate (both reagent grade) to 1,300° C. to produce a fine powder, (e.g. U.S. Pat. No. 3,531,308). A magnesium-salt $(MgSO_4.7H_2O)$, aluminum-salt $(Al_2(SO_4)_3.18H_2O)$ mixture, co-crystal has been employed to prepare a powder which is then shaped into ceramic bodies by hot press techniques with or without the use of binders, (e.g. U.S. Pat. No. 3,544,266).

Concomitant with these developments researchers investigated the nature of metal double hydroxides formed by coprecipitation, some of which were shown to convert to a spinel upon calcination. Early work was performed by Feitnecht and his students who made a series of double hydroxides with Mg/Al ratios of 2.5 to 1, even employing a reactant range of 1.5–4 to 1 Mg/Al, by coprecipitation from magnesium and aluminum chlorides, Helv. Chim Acta 25, 106–31 (1942), 27, 1495-1501 (1944). No change could be detected by x-ray diffraction techniques then available for different Mg/Al ratios or a certain degree of substitution by chloride for hydroxide. A similar double hydroxide, reported to be a hydrate even after heating to 150° C., was reported by Cole and Hueber in "Silicates Industriels" Vol. 11, pp 75–85 (1975). The compound was made by the reaction of NaOH with Al metal or $Al_2(SO_4)_3$ and MgO or $MgSO_4$ at 65°–70° C. The product had a Mg/Al ratio of 4/1 even when reactant proportions were varied. However, $Mg(OH)_2$ was observed as a second phase in some cases.

More recently, Bratton in both Journal of The American Ceramic Society, Vol. 52, No. 8 (2969), and Ceramic Bulletin, 48, #8 pp 759-62 (1969) 48, 11, pp 1569-75, reported the coprecipitation of numerous magnesium and aluminium chlorides and oxalates which on heating, drying, calcining or firing, exhibited a spinel x-ray diffraction crystallographic pattern. The coprecipitation product resulted in a magnesium aluminum double hydroxide of composition $2Mg(OH)_2.Al(OH)_3$, plus a large amount of segregated gibbsite $Al(OH)_3$ phase (see also U.S. Pat. No. 3,567,472). This is presumably the same product Feitnecht obtained.

Bakker and Lindsay in "Ceramic Bulletin" Vol. 46, No. 11, pp 1095-1097 (1967) report that a high density spinel body can be made from $Mg(OH)_2$ and $Al(OH)_3$ if 1.5% $AlF_3$ is added as a mineralizer.

In the works cited above these powders were, in some instances, calcined then fired while in other instances the powders were heated through the calcining range and ultimately through the firing and even the fusion range. Early work was directed to preparing spinels usable as a decolorant, U.S. Pat. Nos. 2,395,931 and 2,413,184 or as antacids, U.S. Pat. Nos. 3,323,992 and 3,300,277. In the last case a "highly hydrated magnesium aluminate" is claimed as a new composition of matter, the formula of which is $Mg(OH)_2.2Al(OH)_3.XH_2O$ where X=4 to 8. The material is prepared by the reaction of $NaAlO_2$ $(Na_2Al_2O_4)$, NaOH and $MgCl_2$ as aqueous solutions at a pH from 8–9. Bratton in U.S. Pat. No. 3,567,472 also discloses coprecipitation of a magnesium and aluminium chloride from a solution having a pH from 9.5 to 10, drying or firing to obtain a light-transmitting spinel by adding CaO.

BRIEF DESCRIPTION OF THE INVENTION

In accordance with the present invention a spinel can be prepared by coprecipitating metal compounds, that is the metal halides, sulfates, formates, hydrogen phosphate, hydroxides, acetate, nitrate, carbonate, bicarbonate and the like, or mixtures thereof including hydroxycarbonate, chlorohydroxide, the halogenated carboxylates, in a proportion and kind to provide metal atoms of two different valences, albeit they may be the same metal or different metals, to total eight, plus or minus about 10%, positive valences available to combine with four oxygen atoms in the generic stylized formula $M_3O_4$ (or $MM_2'O_4$). The coprecipitation produces, when conducted at pH in the range of from 8 to 10 at which coprecipitation occurs, (usually between about 9 and 9.5 for Mg/Al), a product having a specific layered crystalline structure which may or may not contain a segregated aluminum hydroxide or oxyhydroxide phase. The product slurry may be treated with an alkaline solution before being filtered and washed. This alkaline wash may be used to increase the Mg/Al ratio of the coprecipitate by the selective dissolution of Al from the coprecipitate. The coprecipitate is then dried and calcined at a temperature of from 400° C. to 1400° C. thereby forming the crystal lattice of the spinel structure with little or no segregated phases of either metal. The so-formed spinel, usually a powder, can be sintered at a temperature above about 1,500° C. with or without shaping into a thermally and chemically stable product capable of achieving greater than 99% of the theoretical density of a spinel crystal lattice structure. The resulting high density products are resistant to acidic and basic attack and shock including thermal shock.

Thus, it has now been found, for example, if a magnesium compound such as, magnesium hydroxide, or the chloride, hydroxychloride, sulfate, phosphate, acetate, nitrate, halide, carbonate, bicarbonate, and the like, is coprecipitated with an aluminum compound, such as aluminum hydroxide, or the chloride or sulfate, at a pH to coprecipitate the compounds so that at least one of the metals is converted to its respective hydroxide or partial hydroxide during the coprecipitation, followed by washing with or without alkalinity before recovering the coprecipitate, there is obtained a product having the following composition upon drying at approximately 125° C. for several hours:

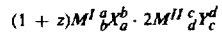

wherein each X and Y is independently selected from the aforementioned anions and at least one X and/or Y is —OH and z represents a number less than 3 and preferably about 1, and where when z is greater than 0 there will be present at least one segregated phase, as for example in the magnesium-aluminum coprecipitate, an aluminum phase of $Al(OH)_3$ and/or $AlO(OH)$, and wherein "a" times the number of atoms of $M^{I(b)}$ equals the valence b of X times a, the number of atoms of X, and similarly c times the number of atoms of $M^{II(d)}$ equals the valence d of Y times c, the number of the atoms of Y, the $M^{II}/M^I$ ratio in the total coprecipitate being maintained at about 2 to 1 respectively, and having a volatile content of about 40% by weight when a Cl atom is present and about 36% by weight when all the X and Y's are —OH moieties, (analysis by thermogravimetric analysis). The exemplified coprecipitate is not a hydrate and individual crystallites have $M^{II}/M^I$ ratios significantly different from those previously reported, for example when $M^{II}$ is aluminum and $M^I$ is magnesium, as shown by micro-area x-ray fluorescence, electron diffraction and high resolution x-ray diffraction. The dried precipitate is thereafter calcined at a temperature of from 400° C. to 1,400° C. for from typically about 4 hours to about 1 hour, respectively. The calcined precipitate has an x-ray diffraction pattern of the spinel structure, for example, $MgAl_2O_4$. The so-calcined precipitate can be formed into bricks or other ceramic shapes by pressing at preferably between 1000 to 10,000 psig although higher pressures may be employed and firing the shape at above about 1,400° C., preferably above 1,500° C. The shape will densify uniformly. Thus, densities may range from as low as 50% to as high as 99% or greater of theoretical density, depending on the following variables:

1. The chemical composition of the powder;
2. The calcination history of the powder;
3. Powder processing history, i.e. particle size distribution selected for pressing, lubricants and binders added to the powder, and the like;
4. Mode of pressing the powder into a shape and sintering technique used.

In accordance with the present invention a (thermally and chemically stable) spinel can be prepared by coprecipitating metal compounds (e.g., magnesium and aluminum hydroxides, or chloro hydroxides), that is, coprecipitating a metal compound or compounds having an atomic valence of one, two, three, four, or six or convertible thereto on conversion to the oxide, recovering the precipitate as a powder and calcining the powder, thereby to prepare a spinel suitable for sintering with or without shaping.

Spinels are well known metal oxides having a specific structural configuration and having a generic formula $M_3O_4$ where M is at least two metal atoms $M^I$ and $M^{II}$, which may be the same or different metal elements, having different valences whose sum of products of the valence times the number of atoms of each valence equal, preferably eight but may vary up to a few percent excess or deficiency from eight. Exemplary of the common formula are $ZnCo_2O_4$ and $MgAl_2O_4$ where the sum of the product of the valence times the number of atoms equals eight. Exemplary of imbalanced stoichiometry, excess and deficient atom structures, are e.g., $Mg_{0.9}Fe_1 \cdot 11Al_2O_4$, and $Ni_{0.2}Co_{0.79}Al_2O_4$.

In addition to the basic spinel, numerous mixed spinels were prepared. Mixed spinels can be made in any one of several ways. The preferred way is to add the desired metal at the coprecipitation step. However, this may not always be practical, or the hydroxides may have such a large difference in solubility that a coprecipitate with the desired composition is not formed. The second method of preparation is to mix the separately prepared compounds in the desired ratio. This requires only a knowledge of the metal content by, say, x-ray fluorescence. The mixture may be ground intimately if a homogeneous composition (e.g. one mixed phase such as $Mg_{0.3}{}^{+2}Co_{0.7}{}^{+2}Al_{1.3}{}^{+3}Co_{0.7}{}^{+3}O_4$) is desired. It is also to be recognized that when the "mixed spinels" are desired and the third metal is or two or more additional metals are added at the coprecipitate stage the pH for coprecipitation may have to be varied, as for example when chromium is added the pH is adjusted to about 9.7 to insure coprecipitation of all three metals in, for example, a Mg/Al/Cr system. Alternately, a dry mixture may be mixed poorly, or a gross disparity in the particle size distribution of the starting materials may be introduced, if a range of compositions is desired (e.g. $Mg_x+^2Co_{1-x}Al_{2-y}+^3Co_y+^3O_4$, where x and y vary from region to region in the mass). The most preferred way to prepare a range of solid solutions within one sample is to add at least one of the metals as the hard burned oxide which limits its reactivity. One should not assume that the same effect will be achieved if the preburned oxide is the spinel component versus it being the additive metal. In general, the higher the preburned component has been calcined, the lower its activity will be toward solid solution formation. In some cases part of the additive metal may enter the spinel structure and part may form a separate oxide phase. In addition, a doping metal compound may be added to the pre-calcined or post-calcined spinel and may exhibit phase segregation or solid solution formation, depending on its reactivity and that of the spinel phase.

In accordance with the present invention a spinel can be prepared by co-precipitating metal compounds, that is the metal sulfates, chlorides, hydroxides, hydroxychlorides, oxychlorides and the like, or mixtures thereof as afore set forth, in a proportion and kind to provide metal atoms of two different valences, albeit they may be the same metal or different metals, to total eight or about eight positive valences available to combine with oxygen in the generic stylized formula $M_3O_4$ (or $M_a^I{}_2\cdot M_b^{II}O_4$). The coprecipitate is preferably washed with an alkaline solution, dried and calcined at a temperature of from 400° C. to 1,400° C., preferably from 1,000° C. to 1,200° C. thereby forming the crystal lattice of the spinel structure. The so-formed spinel, usually a powder, can be sintered with or without shaping into a thermally and chemically stable product capable of achieving a density of greater than 99% of the theoretical density of a spinel crystal lattice structure. The resulting high density products have good chemical and mechanical properties.

It is to be further understood that modifications in the stoichiometry may be made so long as it is understood and desired to produce less dense (final density less than about 90% of theoretical) products and/or separate metal oxide crystal phases admixed with and bordering the spinel crystallites in the body. In fact one can so deviate from the stoichiometry of the normal spinel that there are obtained products similar in analysis to those obtained by the fusion melt practiced by the industry, i.e., a large proportion of segregated phase, (e.g. high magnesium oxide separate phase) which depending on use, may or may not be detrimental.

The modified spinels, in contradistinction to the mixed spinels of the present invention, can be obtained by mixing, (a) during coprecipitation, an excess of one or more of a metal compound coprecipitants, (b) a desired separate phase metal compound with the coprecipitated uncalcined precursor (c) an additive oxide with the calcined intermediate of the present invention prior to sintering, or (d) an additive oxide can be added to the spinel following grinding and sintering, but before shaping, especially if simple physical mixtures are desired.

The utility of the products of the present invention permit a wide variation in manufacturing techniques. For example, ceramic shapes, such as bricks, can be made by casting the calcined spinel powder using an aqueous suspending medium or compressing the calcined intermediate under moderate pressure and then sintering, the densification of the spinel occurring during unpressured sintering, or the powder can be subjected to fusion molding of brick or like forms. In addition, a conventional brick can be coated with the calcined intermediate powder and the coating sintered on the surface or a melt of the sintered spinel can be sprayed on a surface, the sintering, at least-in-part, occurring during the melt-spray technique.

As stated above, modifying metals can be incorporated into the process at various stages with different results. For example, iron oxide may be added at any stage and when added as a part of the coprecipitates it will enter into a spinel lattice since it has the capability of forming both two and three valence atoms which are capable of orientation into the spinel lattice structure form and if the iron is added as exemplified above to the coprecipitates of say Mg and Al, the final spinel will take the structure exemplified by the formula

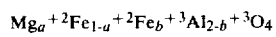

$$Mg_a+^2Fe_{1-a}+^2Fe_b+^3Al_{2-b}+^3O_4$$

where a=0 to 1, b=0 to 2 and where, depending on the amount of iron, the iron may be the principal metal or the modifying metal. If, on the other hand, the iron is added to the already sintered spinel the majority of the iron will be present as a separate phase. In the case of multivalent metals such as iron, a spinel lattice such as $Fe^{+2}.(Fe^{+3})_2.O_4$ may form as a separate structure and/or become a solid solution type crystal intermingled with the magnesium aluminate spinel to which it has been added. Some variation in the tendency to form a segregated phase is observed when the atmosphere is highly oxidizing vs. when it is inert.

In one embodiment of the present invention sodium aluminate ($Na_2Al_2O_4.3H_2O$) was mixed with magnesium chloride ($MgCl_2$) in the presence of hydrochloric acid (HCl). The dispersed precipitate was washed, preferably in an alkali solution, filtered and washed again with water, dried and calcined at a temperature of from 900° to 1,400° C. to form fine discrete particles suitable for compression-forming into desired shapes, such as bricks, which can be sintered at above about 1,400° C., preferably above about 1,500° C.

In another embodiment a bulk grade of aluminum hydroxide was dissolved in sodium hydroxide, then filtered and the soluble aluminate employed in the manner of the foregoing description.

In still another embodiment aluminum sulfate and magnesium sulfate were employed as the coprecipitants employing sodium hydroxide as the source of alkalinity. The resulting co-precipitate was treated as before.

In like manner, aluminum chloride and magnesium chloride were coprecipitated in the presence of sodium hydroxide and the precipitate treated as above.

In another embodiment magnesium and aluminum chlorides were reacted with sodium hydroxide and then hydrochloric acid to control the pH of precipitation and the precipitate treated as before.

In yet another embodiment the metal chloride was converted to the hydroxide, as $AlCl_3$ to $Al(OH)_3$, then reacted with the chloride or hydroxy chloride of the other metal and the product treated as above.

More particularly, the present invention is carried out, in a presently preferred manner, by the simultaneous precipitation or coprecipitation of metal compounds which are, of which form on treatment with an alkali wash, separation and heating, the metal hydroxides or partial metal hydroxides, and then subsequently on heating above about 1,400° C. the metal oxide. The proportion of the metals is such that the sum of the valences of each metal multiplied by its atomic quantity will total 8 or about 8, i.e. plus or minus ten percent. The spinel structure is identified by this ideal metal valence to the 4 oxygen atoms present as $M_3O_4$ (or $M_a{}^I.2M_b{}^{II}O_4$). It is to be understood that a slight deficiency or excess in total metal valence over 8 may occur with a concomitant small change in final product, yet most of the spinel characteristics of the products of this invention remain. Illustrative of the aforedescribed embodiments including the imperfect valence balance are hereafter set forth, with specific reference to aluminum and magnesium, it being understood that other common metals may be substituted for either or both aluminum or magnesium and still obtain the benefits of this invention.

The simultaneous precipitation of metals in the ratio to obtain the spinel structure in accordance with the preferred embodiment of the present invention results in a precipitate which has an overall stoichiometry of $M^IM_2{}^{II}(OH)_8$ in more detail depending on the valence, $M^{I+6}2M^{II+1}(OH)_8{}^-$, $M^{I+4}2M^{II+2}(OH)_8{}^-$, $M^{I+2}\cdot 2M^{II+3}(OH)_8{}^-$. The ratio of $M^I$ to $M^{II}$ is 2 but may vary up to 10% excess of either. In this latter case it is believed that in some instances the 8 valences required for the spinel structure and the 2 to 1 metal ratio are fulfilled first and the excess metal forms a separate oxide phase surrounding or occluded within the spinel crystallites.

The coprecipitates in the above form, e.g., $M^IM_2{}^{II}(OH)_8$ where $M^I$ is a divalent metal atom and $M^{II}$ is a trivalent metal atom, is made up of layered crystallites with the following composition, as evidenced by x-ray diffraction, electron diffraction, electron microscopy and micro area x-ray fluorescence.

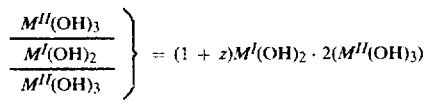

plus separate phases $2M^{II}O(OH)$ (also written $M_2{}^{II}O_3\cdot H_2O$) and $M^{II}(OH)_3$ to maintain the overall product stoichiometry $M^IM_2{}^{II}(OH)_8$ when z greater than zero but less than 3. Some of the hydroxide in this structure can be replaced by Cl, Br, nitrate, acetate, sulfate or various other anions and mixtures of anions as discussed previously.

This particular layered structure is in evidence in each of the following preparations made from the wet state. The crystal structures can be indexed on the basis of a hexagonal unit cell in which the a axis is the most sensitive to changes in cation size and the c axis is the most sensitive to changes in anion size. Following calcining of the dry powder the x-ray diffraction pattern matches that of the spinel plus, provided that if the stoichiometry is not exact, evidence of separate phases of other metal oxides.

Several other techniques can be employed as illustrated below, each forming the layered structure as the coprecipitate. The spinel structure on calcining is amenable to low pressure forming and densification on sintering.

Specifically, one can co-precipitate an aluminum magnesium spinel precursor (which after calcining forms the spinel) by one of the following techniques wherein $M^I$ represents for balanced equations a divalent atom, namely for illustrative purposes only magnesium, and $M^{II}$ represents a trivalent atom, namely aluminum.

1. $M^IX + M^{II}Y +$ aqueous alkaline solution$\rightarrow M^IX' +2M^{II}Y' +$ alkali or alkaline X, Y in solution for example

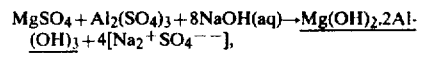

or,

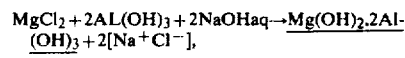

(it is to be understood that the equations given here represent the overall stoichiometry of the reaction and not necessarily the composition of a specific crystallite, that is the layered structure, is not here exemplified) which is washed with water or an aqueous alkaline solution (e.g. aqueous caustic), the solid separated and washed again. The product exhibits layered structures as aforedescribed. The product when dried and calcined at between about 400° and 1400° C. forms a fine powder which by x-ray diffraction has the spinel structure $M^IM_2{}^{II}O_4$.

2. $2AM^{II}Y + M^IX +$ alkaline solution + acidic solution$\rightarrow \underline{M^IX'.2M^{II}Y'} +[A^+X^-]$, A being alkaline ion, for example $2NaAlO_2 + MgCl_2 + NaOH(aq) + HCl(aq) \rightarrow (1+z)Mg(OH,Cl)_2.2Al(OH)_3 + 2z(Al(O)OH + Al(OH)_3) + [Na^+Cl^-]$, followed by washing with or without added alkalinity, separation, washing the separated precipitate and drying.

3. $M^IX + 2M^{II}Y +$ aqueous alkaline solution$\rightarrow M^I(X)_2.2M^{II}(Y)_3 + [A^+Y^-]$,
for example
$MgCL_2 + 2AlCl_3 +$ aqueous alkaline solution$\rightarrow (1+z)Mg(OH,Cl)_2.2Al(OH)_3 + 2z(Al(O)OH + Al(OH)_3) + [Na^+Cl^-]$, followed by treatment of the precipitate as aforedescribed.

4. $M^IX + 2A.AlY + HCl \rightarrow \underline{M^IX'.2.AlY'} + ACl$, A being alkaline ion, for example $MgCl_2 + 2NaAlO_2 + HCl \rightarrow (1+z)Mg(OH,Cl)_2.2Al(OH)_3 + 2z(Al(O)OH + Al(OH)_3) + [Na^+Cl^-]$, followed by treatment of the precipitate as aforedescribed.

Another technique for preparing the precursor is the comixing of finely divided aqueous slurries:

5. $M^IX$ or $M^IX.nH_2O + M^{II}(OH)$ mixed as an aqueous slurry will after precipitation, recovery, drying and calcining followed by sintering, yield a spinel of the present invention, e.g., $MgCl_2.2H_2O$, $Mg(OH)Cl$ or $Mg(OH)_2$ mixed with $Al(OH)_3$.

It is also to be understood that the powders produced in accordance with this invention can be pressed onto and into porous surfaces and sintered thereon to give protective spinel coatings or surfaces of similar acid/base resistance.

Examples of the various metals which can be employed in preparing spinels of the present invention are:

| +1 | +2 | +3 | +4 | +6 |
|---|---|---|---|---|
| Li+ | Mg++ | Al+++ | Ti++++ | Mo++++++ |
|  | Fe++ | Fe+++ | Mn++++ | W++++++ |
|  | Mn++ | Cr+++ | Sn++++ |  |
|  | Co++ | Co+++ | V++++ |  |
|  | Ni++ | Ga+++ |  |  |
|  | Cu++ |  |  |  |
|  | Zn++ |  |  |  |

It is of course to be understood that several metals may be employed to form a single mixed metal spinel as for example

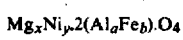

where x and y represent fractional numbers totalling 1 and a and b represent fractional numbers totalling 1. In this example of course the Mg and Ni are divalent atoms and Al and Fe are trivalent atoms. In the foregoing example iron may be added in such a way that a spinel of the following structure may be formed

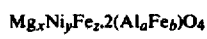

where again x+y+z=1 and a+b=1 and Mg and Ni and some Fe are the divalent metals and Al and the remaining Fe are the trivalent metals.

DETAILED DESCRIPTION OF THE INVENTION

EXAMPLE 1

One hundred fifty-nine liters of an aqueous solution of 7.5% by weight $Al_2(SO_4)_3$ and 2.5% by weight $MgSO_4$ was treated (mixed) with 117.7 liters of 8.26% NaOH containing 15.95% NaCl (a chlorine cell effluent) at a rate to provide a retention time of 28.5 minutes. Following the treatment of the sulfate solution the overflow containing a precipitate at 50° C. was filtered under a six (6) inch mercury vacuum and washed with 3 cake volumes of distilled water. The washed cake was 14.5% solids. This cake was dried to a powder and analyzed for mole ratio of aluminum to magnesium. The ratio was 2.1 to 1, respectively.

The powder was calcined at 1,100° C. for 3 hours. By x-ray diffraction analysis the calcined powder had acquired a spinel structure. Upon sintering at about 1,700° C. the powder acquired a density of 3.23 g/cc.

The following examples illustrate various modifications in the procedure of Example 1 employing various magnesium and aluminum compounds:

| Examples | 2 | 3 | 4 |
|---|---|---|---|
| Duration (min) | 130 | 168 | 350 |
| Reactants: | | | |
| (a) Salt Solution | | | |
| wt. % Mg Salt ($MgCl_2$) | 8.41 | 2.05 | 10.18 |
| wt. % Al Salt ($AlCl_3$) | — | 5.7 | — |
| wt. % HCl | 3.55 | 2.37 | — |
| Vol. Liters | 19.3 | 55.15 | 24.05 |
| (b) Alkaline Solution | | | |
| Kind | $NaAlO_2$ | NaOH | $NaAlO_2$ |
| wt. % NaOH | 5.33 calc | 9.5 | 5.04 calc |
| wt. % $Al(OH)_3$ | 6.46 calc | — | 7.62 calc |
| wt. % NaCl | — | — | — |
| Vol. Liters | 33.6 | 56 | 49.5 |
| (c) Acid Solution | | | |
| Kind | — | — | HCl |
| wt. % HCl | — | — | 9.77 |
| Vol. Liters | — | — | 8.03 |
| (d) Mol Ratio Al/Mg | 1.62 | 1.99 | 2.0 |
| Precipitation @ 50° C. | | | |
| pH M pptr. | 9.2–9.5 | 9–9.5 | 9.2–9.4 |
| Retention time (min) | 22 | 21 | 61 |
| Filtration | | | |
| Vacuum inches Hg (abs.) | 6 | 6 | 6 |
| Load Rate gph/ft2/1" cake | 59 | 22 | 101 |
| Wash rate gph/ft2/1" cake | 30 | 14 | 68 |
| Wet Cake % solids | 21.5 | 16.0 | 27.2 |
| Dry washed cake | | | |
| wt. % $Mg(OH)_2$ | 22.55 | 24 | 25.0 |

| -continued | | | |
|---|---|---|---|
| Examples | 2 | 3 | 4 |
| Duration (min) | 130 | 168 | 350 |
| wt. % $Al(OH)_3$ | 63.5 | 72 | 75.4 |
| Mol Ratio Al/Mg | 2.11 | 2.24 | 2.26 |
| Density of calcined and sintered product gm/cc | — | 3.24 | 3.50 |

Density Studies

The powder of Example 2 was calcined at 1000° C. for approximately four hours and was pressed in a Beckman powder mold under various pressures to produce a 1¼ inch diameter by ½ inch thick tablet and thereafter sintered at either 1,535° C. or 1,400° C. and the average density thereof determined. The following table sets forth the results obtained:

| Pressure PSI | Sintering Temperature °C. | Density gm/cc |
|---|---|---|
| 5,000 | 1535 | 3.29 |
| | 1400 | 2.21 |
| 10,000 | " | 3.42 |
| | " | 2.20 |
| 15,000 | " | 3.42 |
| | " | 2.11 |
| 20,000 | " | 3.39 |
| | " | 1.92 |

The data establishes that a sintering temperature of about 1,535° C. or above should be used to achieve the greatest densification and concomittant therewith a pressure of greater than or equal to about 8,000 psig is also advantageous. Sintering below about 1,400° C. results in densification less than about ⅞ theoretical, 3.57 gm/cc being the theoretical density of the $MgAl_2O_4$ spinel, based on crystallographic unit cell data for the final product and literature data. Depending on the chemical composition, calcination history, powder processing methods and pressing and sintering techniques, sintering densities greater than 99% of the theoretical values were sometimes obtained.

The tablets pressed at greater than 5,000 psig and sintered at 1,535° C. were subjected to contact with caustic beads at 1,500° C. or with 15% boiling hydrochloric acid. Neither treatment appeared to react or significantly affect the surface or strength of the tablet thus treated.

The magnesium aluminate spinels of this invention, either the calcined or the powdered or shaped fired spinels, have the ability to combine (even at relatively low temperatures) with other oxides, halides, hydroxides or coprecipitates of aluminum and other metals including, but not limited to, those of the transition metal series to yield products exhibiting altered properties. These properties include sinterability, stability to oxidation or reduction, strength, porosity and catalytic activity.

EXAMPLES 5–8 Mg-Al Spinel Precursor

Examples 5 and 6 are precursors that were produced at reaction conditions about identical to Example 4 described above. The reaction slurry was treated with a NaOH solution before filtering. The precursor had an excellent filter rate and a low cake solids content (18–20% solids). Its Al/Mg mole ratio was 2.01. The precursor sintered to very dense spinel after calcining at 1,000°–1,200° C.

Example 8 was produced at a higher reaction temperature (60° C.) and a longer retention time (4 hours) to improve filtration and drying properties. The reaction slurry was concentrated by settling, NaOH treated, and filtered. The filter and dryer capacity were much improved over examples 5 and 6 due to a much higher cake solids content. Although the sintering properties of preliminary precursor Example 7 matched those of Examples 5 and 6, which were calcined at about 1000° C. and sintered at about 1,500° C. subsequent sintering of Example 8 showed the need for a higher calcining temperature of about 1,200° C. to obtain high density spinel upon sintering (at ca. 1,500° C.) unless the precursor was upgraded by size reduction (ball milling or double compaction). The reason advanced was that Example 8 had an excess of aluminum in the precursor phase which formed a segregated aluminum oxide phase upon calcining. Aluminum oxide inhibits the sintering of the spinel phase as discussed later in Example 13, part 4.

| Example | 5 | 6 | 7 | 8 |
|---|---|---|---|---|
| Duration of run (hrs) | 29 | 28 | 20 | 65 |
| Reactants: | | | | |
| (a) Salt Solution | | | | |
| wt. % $MgCl_2$ | 10 | 10 | 9.94 | 10 |
| Vol. Gallons | 734 | 703 | 295 | 2030 |
| (b) Alkaline Solution | | | | |
| Kind $NaAlO_2$ | | | | |
| wt. % NaOH calc. | 1.13–1.19 | .89–1.15 | .87–1.25 | .7–1.0 |
| wt. % $NaAlO_2$ calc. | 8.04–8.34 | 8.37–8.76 | 8.71–7.91 | 8.2–8.7 |
| Vol Gallons | 1525 | 1416 | 317 | 4096 |
| (c) Acid Solution | | | | |
| Kind HCl | | | | |
| wt. % HCl | 8.8 | 10 | 10 | 9.7 |
| Vol. Gallons | 299 | 209 | 123 | 679 |
| (d) Mol Ratio Al/Mg | 2.01 | 2.01 | 2.02–2.07 | 1.99–2.03 |
| Precipitation @ °C. | 50 | 50 | 60 | 60 |
| pH $\bar{M}$ pptr. | 9.3–9.4* | 9.05–9.4* | 9.1–9.3* | 9–9.4* |
| Retention time (min) | 55–58 | 69–72 | 226–237 | 247–260 |
| Filtration | | | | |
| Load Rate gph/ft²/1" cake | 43 | 30–40 | 58 | 42 |
| Wash rate gph/ft²/1" cake | 24 | 25–30 | 56 | 23 |
| Cake % solids | 21.4 | 21–22 | 35.9 | 35–37 |
| Dry washed cake | | | | |
| wt. % $Mg(OH)_2$ | 26.0 | 26.2 | — | 26.4 |
| wt. % $Al(OH)_3$ | 75.1 | 72.1 | — | 76.0 |
| Density of calcined and sintered product gm/cc | 3.44–3.52 | 3.47–3.53 | 3.56 | 3.51 |

*range during run

The above data represents that obtained in the laboratory. The batches were large enough to employ a commercial-size filter and the cakes obtained by such use where also analyzed and used in various operations described in later examples. The data for each batch from the Moore filter cake were: Each slurry was treated with 10% sodium hydroxide and washed with raw (untreated) water.

| Example | 5 | 6 | 7 | 8 |
|---|---|---|---|---|
| Slurry Wash | | | | |
| 10% NaOH gal/100 gal | 5 | 5 | 4.7 | 11* |
| Water (cake volumes) | 3 | 3 | 4 | 4 |
| Cake-% solids | 18–20** | 18–20** | 35.9 | 34–36** |
| Dry Solids | | | | |
| % $Mg(OH)_2$ | 26.0 | 26.2 | | 26.4 |
| % $Al(OH)_3$ | 75.1 | 72.1 | | 76 |
| Sintered density at 1500+° C. of sample calcined at: | | | | |
| 1000° C. (2 samples) | 3.46/3.46 | 3.47/3.48 | 3.48 | 3.1–3.3/3.1–3.4 |
| 1200° C. | 3.46 | 3.49 | 3.56 | 3.1–3.5 |

*This run was settled and decanted before treatment with the caustic wash.
**ranges during run.

EXAMPLE 9

Physical Mixtures with Other Oxides/Halides

The spinel powders $MgAl_2O_4$ of Examples 5 and 6 were calcined at 1,000° C. for approximately four hours and were then mixed in various amounts with other metal oxides or fluorides, pressed at 10,000 psig and sintered at 1,535° C. to determine the effect these compounds would have on the densification characteristics of spinel.

In one experiment mixtures of calcined spinel powder and alpha-aluminum oxide were prepared by ball-milling. Pellets, 1¼ inch in diameter, weighing approximately 10 gms. each were formed at a pressure of 8,000 psig composed of (1) pure alpha $Al_2O_3$, (2) pure spinel powder ($MgAl_2O_4$), as well as the following mixtures: (3) 90% $Al_2O_3$/10% $MgAl_2O_4$; (4) 75% $Al_2O_3$/25% $MgAl_2O_4$. All pellets were sintered for 2 hrs. at 1,535° C. The percent volume reduction was as follows: (1) 11%, (2) 46%, (3) 17%, (4) 22%. As is seen from this data the spinel powder of the present invention can act as a densification aid when mixed with alpha aluminum oxide.

In another example, pellets, 1¼ inch in diameter, weighing approximately 10 gms each, were formed at 8,000 psig using ground powder composed of (1) pure MgO, (2) 90% MgO/10% $MgAl_2O_4$ (calcined powder of example 2), (3) 75% MgO/25% $MgAl_2O_4$ (calcined powder of example 2). All pellets were sintered for 2 hours at 1,535° C. Theoretical densities, measured densities and the percent of the theoretical density obtained are given below. The theoretical density of the composites was calculated from a weighted average of the theoretical densities of the pure components. MgO and $MgAl_2O_4$ are almost identical in theoretical density.

| | (a) | (b) | (c) |
|---|---|---|---|
| % MgO | 100 | 90 | 75 |
| % Spinel $MgAl_2O_4$ | 0 | 10 | 25 |
| Theoretical Density (gm/cc) | 3.59 | 3.59 | 3.59 |
| Measured Density (gm/cc) | 2.41 | 2.64 | 2.82 |
| % of theoretical obtained | 67% | 74% | 79% |

As is seen from this data the spinel powder of the present invention acts as a densification aid when mixed with magnesium oxide under these conditions. An alternate way to look at the data is that substantial amounts of MgO or $Al_2O_3$ will inhibit the densification of spinel powder. This behavior can be beneficial in the manufacture of catalyst supports where porosity is desirable.

In another example small amounts of lithium fluoride were ground together with the calcined spinel of Examples 5 and 6 and 1¼ inch diameter pellets, weighing approximately 10 gms each, were formed at 8,000 psig and fired for 2 hours at 1,535° C. The measured density obtained, calculated theoretical densities determined as before, and the percent of theoretical density calculated are given below for the compositions indicated. The density used for LiF was 2.635 gm/cc.

|  | (d) | (e) | (f) |
|---|---|---|---|
| % spinel (MgAl$_2$O$_4$) | 100 | 99.5 | 99 |
| % LiF | 0 | .5 | 1.0 |
| Theoretical density (gm/cc) | 3.58 | 3.57 | 3.56 |
| Measured density (gm/cc) | 3.27 | 2.73 | 2.62 |
| % of theoretical obtained | 91% | 76% | 74% |

As is seen from the data a small amount of LiF greatly inhibits the densification of magnesium aluminate spinel.

In the three examples discussed above it was shown that the densification properties of the spinel powder of this invention can be altered through the addition of various other oxides or halides. In the case of MgO and Al$_2$O$_3$, the moderating agent remained substantially as a segregated phase, as shown by analytical investigation. The fate of the LiF was not determined.

Solid Solutions with Other Oxides

In addition to physical mixtures, the spinel powder of this invention can also form solid solutions with other metal oxides. This ability can be used to alter the characteristics of the resultant system in unique ways. The metal oxides which can be used to form mixed spinel systems include, but are not limited to, members of the transition elements. For example, mixtures of hematite (Fe$_2$O$_3$) and the calcined spinel powder (MgAl$_2$O$_4$) were pressed and sintered at ~5,000 psi and 1,535° C. The resultant products showed a single spinel phase whose cell constants varied in accordance to the composition of the original mixed powders. This relationship holds for the entire series of combinations whose end members are magnesium aluminate (MgAl$_2$O$_4$) and magnetite (Fe$_3$O$_4$). The original hematite is incorporated into the spinel lattice involving a reductive alteration of some of the Fe$^{+3}$ to Fe$^{+2}$-even in air at 1,535° C., whereas hematite not mixed with the spinel, stays in the trivalent state as Fe$_2$O$_3$ when fired at 1,535° C. in air. A regular progression of densities is noted, as would be expected.

As discussed below, the atmosphere employed plays a role in determining whether a homogeneous phase is observed versus a mixture of phases.

EXAMPLE 10

Physical mixtures of hematite ($\alpha$-Fe$_2$O$_3$) and the calcined powder of this invention (MgAl$_2$O$_4$ from Examples 5 and 6) were made by ball-milling the powders together in the following ratios by weight: 90% MgAl$_2$O$_4$/10% Fe$_2$O$_3$; 80% MgAl$_2$O$_4$/20% Fe$_2$O$_3$, etc., up to 10% MgAl$_2$O$_4$/90% Fe$_2$O$_3$. Ten gram pellets of each of the above compositions were pressed at 5,000 psi and sintered at 1,535° C. under argon for 2 hrs. The resultant material was shown to be a single phase spinel of the type Mg$_x^{+2}$ Fe$_{1-x}^{+2}$ Al$_{2-y}^{+3}$ Fe$_y^{+3}$O$_4$ by high resolution x-ray diffraction and measurement of the magnetic properties of the samples. The cubic cell parameter determined from the diffraction data was found to vary linearly from ~8.08 A° for pure MgAl$_2$O$_4$ to ~8.40 A° for pure Fe$_3$O$_4$. In cases where sintering of the above compositions was carried out in air instead of argon a homogeneous mixed spinel was again observed by x-ray diffraction in cases where the iron oxide content was less than about 40% by weight, but for higher levels of iron oxide in the starting materials a separate Fe$_2$O$_3$ phase was seen in addition to one or more mixed magnesium aluminum iron spinels.

In addition to pressed pellets one inch in diameter, a larger refractory shape (6×4×1 inches) was pressed and fired at 1,535° C. No cracking or delamination was observed. In this case two magnesium aluminum iron spinels were observed by x-ray diffraction with different cell constants. This indicates a difference in the magnesium/aluminum/iron ratio.

It is possible to produce a spinel phase incorporating magnesium, aluminum and chromium whose cell constant varies as a function of the chromium content. Sometimes separate hexagonal phase(s) of the corundum structure (Al$_2$O$_3$) are also formed, depending on the manner in which the chromium was introduced and the thermal treatment which followed. These may be segregated as chromium oxide (Cr$_2$O$_3$) and aluminum oxide (Al$_2$O$_3$) phases or as solid solutions of the corundum type (Al$_x$Cr$_{2-x}$O$_3$). In general, rapid heating and/or poor mixing increases the tendency to form such segregated phases. The surest way to form a homogeneous spinel is to add chromium at the coprecipitation step. This leads to a precursor hydroxide incorporating chromium. Alternately, a coprecipitated gel of the hydroxides of chromium and aluminum can be prepared and this product mixed, either as dry powder or as a wet slurry, with the precursor or the calcined spinel powder of this invention.

EXAMPLE 11

Approximately 18 lbs. of a coprecipitated magnesium, chromium, aluminum hydroxide were prepared in a manner similar to those outlined in examples 2-4. Data concerning the formation of a ceramic body from this product as well as that using the post addition method are given under "Examples of Applications".

X-ray diffraction, electron microscopy and micro energy dispersive x-ray fluorescense indicate a layer hydroxide of magnesium aluminum and chromium, which is less crystalline than that observed for examples 2-4, and a segregated aluminum hydroxide phase(s).

| Example | 11 |
|---|---|
| Duration (hrs) | 5.5 |
| Reactants: | |
| (a) Salt Solution | |
| wt. % Mg Salt (MgCl$_2$) | 7.42 |
| wt. % Cr Salt (CrCl$_3$) | 2.57 |
| Vol. Gallons | 36.4 |
| (b) Alkaline Solution | |
| Kind NaAlO$_2$ | |
| wt. % NaOH calc. | 0.95 |
| wt. % NaAlO$_2$ calc. | 8.25 |
| Vol Gallons | 55.6 |
| (c) Acid Solution | |
| Kind HCl | |
| wt. % HCl | 10 |
| Vol. Gallons | 3.1 |
| (d) Mol Ratio Al/Mg | 1.99 |
| Precipitation @ 50° C. | |
| pH ($\overline{M}$ pptr.) | 9.6-9.7 |
| Retention time (min) | 61 |
| Filtration | |
| Vacuum inches Hg (abs.) | 24 |
| Load Rate gph/ft2/1" cake | 2.5 |
| Wash rate gph/ft2/1" cake | 21 |
| Cake % solids | 20 |
| Density of calcined and | |

| -continued | |
|---|---|
| Example | 11 |
| Duration (hrs) | 5.5 |
| sintered product gm/cc @ 1500° C. | 3.29 |

EXAMPLES OF APPLICATIONS

Refractory Shapes The spinel of the present invention can be used to make a dense single-phase magnesium aluminum oxide refractory shape. For example, 2500 grams of the calcined material is placed in a rectangular die. The die is closed and evacuated for nominally 30 minutes. The powder is pressed to a pressure of 8,000 psi using a hydraulic press. Upon removal from the die, the brick has a green size of about 2.25"×7"×8". The brick was sintered at 1535° C. for 6 hours to obtain a finished product measuring about 1½"×4½"×5½" with a density ≧95% of the theoretical value for a perfect spinel crystal.

Spray Drying It is possible to avoid evacuation of the mold by spray drying the calcined powder using established techniques. For example, 25 lbs. of the spinel powder of example 2 were spray dried using standard binders, plasticizers and defloculating agents at a commercial facility. This spray dried powder was pressed into brick using conventional, commercial technology at a rate of less than or equal to 30 seconds per brick.

Refractory Shapes with Substitution Two different types of chrome doped spinel bricks were formed using a single action dry pressing mode. The first used a coprecipated chromium aluminum hydroxide added to the spinel precursor of example 8. Specifically, 500 grams of coprecipitated chromium aluminum hydroxide (Cr/Al≃1.0) were added to 1,500 grams of precursor and dry ball milled for two hours. The product was then calcined to 1,200° C. and held at that temperature for two hours. Afterward, the calcined material was re-milled for two hours.

A brick shape was produced by placing the powder in a steel mold (coated with oleic acid), applying vacuum for one hour and pressing at approximately 9700 psig. The chrome-spinel brick was then sintered to 1,535° C. at a rate of 100° C. rise per hour. Holding time at 1,535° C. was four hours. The fired density of this spinel brick was 3.34 gm/cc. From high resolution x-ray diffraction, the approximate composition of the solid solution is $MgCr_{0.2}Al_{1.8}O_4$.

Another type of chrome brick makes use of the coprecipitated magnesium-chromium-alumium precursor hydroxide of example 11.

The hydroxide precursor was first calcined at 950° C. and held at that temperature for six hours. Once cooled, the material was dry milled for one hour and then wet milled for 45 minutes. Additives for wet milling consisted of deionized water, 0.5% polyethylene glycol (on dry weight chrome-spinel basis) having an average molecular weight of about 200, and 4% GEL-VATOL® resin grade 20-30 (Poly Vinyl Alcohol) made by Monsanto Plastics and Resin Company. After drying the material at 125° C. for 30 hours, the dried mass was fragmented by hand and ball milled for 1½ hours. This milled chrome-spinel powder was also dry pressed at 9700 lbs psi and sintered to 1,535° C. Holding time at 1535° C. was six hours. Initially the heating rate was 38° C. per hour to a set point of 400° C., then changed to 100° C. per hour. Fixed density of the chromium doped spinel refractory shape was 3.29 grams per cubic centimeter.

In both cases discussed above high resolution x-ray diffraction of the final product revealed a single phase magnesium-chromium-aluminum spinel whose lattice constant is larger than that of pure $MgAl_2O_4$. This lattice expansion and the absence of segregated phases indicates substitution of chromium into the spinel crystal lattice. In other cases where poor mixing or rapid heating was employed segregated phases were observed, as discussed previously.

Example 12 (Mortar/Coating)

As an example of another aspect of this invention, a mortar or refractory coating can be made in the following way. Thirty (30) grams of finely ground spinel precursor, example 5, was slowly added while stirring, to 70 grams of 15% phosphoric acid ($H_3PO_4$). Heat evolution will be noted as the acid base reaction proceeds. This mixture is then heated to ~90° C. for several hours. A grit is then added to produce the desired consistency. This may be, for example, the calcined spinel powder or sintered grain of the present invention or another suitable refractory oxide. A typical combination would be 60 grams of calcined spinel powder with 20 grams of the above slurry. Distilled water may be used to adjust the consistency. Upon air drying for several days this mortar has excellent green strength but remains water dispersible. It can be cured to a water impervious form by firing at high temperatures of 500°-1000° C. for several hours.

Example 13 (Catalyst Supports)

(1) As an example of a pure spinel catalyst support, 50 grams of the loosely packed spinel precursor of the present invention was sintered to 1535° C. for two hours. The resultant porous form has a total porosity of about 26% by mercury intrusion with approximately 90% of these pores in the 2-10 micron range. Similarly, sintering of 50 grams of the precursor for two hours at 1,700° C. yielded a strong porous body of 26% porosity which also had greater than 90% of the porosity in the 2 to 10 micron range. The time and temperature can therefore be used to adjust the physical strength of the support with only small shifts in the pore size distribution.

(2) Catalyst supports can be made from the spinel precursor of the present invention by slurry or slip-casting techniques. For example, 50 grams of the precursor is mixed with 100 grams of water. A small amount of nitric acid (approx. 2 ml) can be added to aid in mixing. The resultant "mud" can be placed in a form or preferably extruded or rolled into the desired shape. The forms are dried at approximately 100° C. for several hours. The "green" forms are then sintered at approximately 1,700° C. to obtain a pure spinel support with ~30% porosity by mercury intrusion and the aforementioned pore size distribution (2-10 microns). Alterations in the rate of drying, amount of water used, firing temperature and particle size of the initial powder can be made to change the porosity and pore size distribution.

(3) Adjustments of the total porosity and pore size distribution can be made by incorporating a burn-out agent into the powder prior to sintering. For example, 50 grams of the spinel precursor of the present invention is mixed with 5 grams of METHOCEL® and 150 grams of water. The resultant paste is shaped and dried for several hours at 100° C. The dried forms are sintered at 1,535° C. for two hours. The resultant support has a porosity of approximately 32% but with the pore size distribution shifted to larger pores than previously cited (5-20 microns). More specifically, 20% of the pores are now in the 10 to 20 micron range. Heavier loadings of METHOCEL ®, for example up to 40% by weight, can be used to increase total porosity at some sacrifice in strength.

(4) The porosity of the support made from the spinel of the current invention may be adjusted by adding a non-sintering (prefired) grain to the mix. For example, 100 grams of the calcined precursor is mixed, by ball-milling, with 100 grams of nominally 5 micron alpha alumina ($\alpha$-Al$_2$O$_3$). The resultant physical mix is sintered at 1,700° C. for 2 hours to produce a hard composite support with approximately 40% porosity with the pores being largely in the 2 to 10 micron range. Similarly, non-sintering grain can be added in the form of hard burned spinel by presintering the spinel of the present invention and grinding to the desired size if a totally spinel system is desired. The addition of conventional binders (e.g., sodium silicate) may be necessary in these cases to achieve satisfactory pellet strength.

We claim:

1. A coprecipitate comprised of a substantially layered crystallite having the structure $$\frac{M^{II}Y}{\frac{M^IX}{M^{II}Y}} = (1+z)M^IX \cdot 2M^{II}Y$$

wherein $M^I$ represents a cation of a metal or mixture of cations of metals having a valence of 1 or 2, and is selected from the group Li, Fe$^{++}$, Mg, Co$^{++}$, Ni and Zn; $M^{II}$ represents a cation of a metal or mixture of cations of metals having a valence of 3 and is selected from the group consisting of Al, Fe$^{+++}$, Cr$^{+++}$ and Co$^{+++}$; X and Y are anions having a valence of 1 or 2 selected from the group consisting of hydroxyl, halogen, sulfate, formate, hydrogen phosphate, acetate, nitrate, carbonate, bicarbonate or mixtures thereof comprized as haloacetate, hydroxycarbonate, chlorohydroxide; z equals or is greater than zero but less than 3, and sufficient segregated phase of $M^{II}.O.Y$ and/or $M^{II}Y$ to produce a stoichiometry of $$M^IX.2M^{II}Y.$$

2. A coprecipitate comprised of a layered crystallite having the structure $$\frac{M^{II}{}_c^qY_c^d}{\frac{M^I{}_b^qX_a^b}{M^{II}{}_c^qY_c^d}} = (1+z)M^I{}_b^qX_a^b \cdot 2M^{II}{}_c^qY_c^d$$

wherein $M^I$ represents one or more metal cations having valence(s) a and is selected from the group Li, Fe$^{++}$, Mg, Co$^{++}$, Ni and Zn; $M^{II}$ represents one or more metal cations, at least one of which is different from $M^I$, having valence(s) c different from a and is selected from the group consisting of Al, Fe$^{+++}$, Cr$^{+++}$ and Co$^{F+++}$;

X and Y each represent one or more anions having valences b and d, in charge balance with a and c, respectively, and X and Y are convertible to the oxide on heating;

the molecular ratio of $M^IX$ to $M^{II}Y$ being $(1+Z)M^IX.2M^{II}Y$ where z equals or is greater than zero but less than 3; and sufficient segregated phases of the formula $M^{II}.O.Y$ and/or $M^{II}Y$ to provide an overall stoichiometry of $M^IX.2M^{II}Y$.

3. A coprecipitate comprised of a generally laminar structure $$M^{II}{}_c^qY_c^d/M^I{}_a^qX_a^b/M^{II}{}_c^qY_c^d$$

wherein $M^I$ represents one or more metal cations having valence(s) a and is selected from the group Li, Fe$^{++}$, Mg, Co$^{++}$, Ni and Zn; $M^{II}$ represents one or more of the cations at least one of which is different from $M^I$ having valence(s) c different from a and is selected from the group consisting of Al, Fe$^{+++}$, Cr$^{+++}$ and Co$^{+++}$;

X and Y each represent one or more anions having valences b and d, in charge balance with a and c, respectively, and X and Y are convertible to the oxide on heating;

the molecular ratio of $M^IX$ to $M^{II}Y$ being $(1+z)M^IX.2M^{II}Y$ where z equals or is greater than zero but less than 3; and sufficient segregated phases of the formula $M^{II}.O.Y$ and/or $M^{II}Y$ to provide an overall stoichiometry of $M^IX.2M^{II}Y$.

4. The coprecipitate of claim 2 wherein the anions X and Y are selected from the group consisting of OH$^-$, I$^-$, Br$^-$, F$^-$, Cl$^-$, SO$_4^-$, Cl(OH)$^-$, H$_2$PO$_4^-$, HPO$_4^-$, HCO$_2^-$, (OH/CO$_3$)$^{-3}$, O-C(O)CH$_3$ its halogenated derivatives, NO$_3^-$, CO$_3^-$, HCO$_3^-$, and mixtures thereof.

5. A magnesium aluminum coprecipitate comprised of a layered crystallite having the structure $$\left.\frac{Al(OH)_3}{\frac{Mg(OH)_2}{Al(OH)_3}}\right\} = (1+z)Mg(OH)_2 \cdot 2Al(OH)_3$$

wherein z=equals or is greater than zero but less than 3, and at least one segregated phase of the formula AlO(OH) and/or Al(OH)$_3$ wherein the overall stoichiometry of the precipitate is MgAl$_2$(OH)$_8$.

6. The magnesium.aluminum coprecipitate of claim 5 wherein z is about 1 and sufficient AlO(OH)/Al/OH) is present such that the Al/Mg ratio in the overall coprecipitate, is about 2 to 1, respectively.

7. The coprecipitate of claim 1 wherein $M^I$ is a mixture of the metal cations, Li and Mg, in an atomic ratio of about 2 to 9, respectively, $M^{II}$ is aluminum, X and Y are each substantially OH$^-$, and (Li+Mg)/Al is 1 to about 2, respectively.

8. The product of claim 1 wherein substantially all X and Y's have been converted to OH's by caustic treatment.

9. The coprecipitate of claim 1 wherein $M^I$ is a mixture of the metal cations Fe$^{++}$ and Mg in an atomic ratio of from about 1 to 9 to about 9 to 1, respectively, $M^{II}$ is aluminum, X and Y are substantially each OH, and the Fe-Mg to Al ratio is about 1 to 2.

10. The coprecipitate of claim 1 wherein $M^I$ is Mg, $M^{II}$ is a mixture of the metal cations Cr$^{+++}$ and Al in a ratio of between 1 to 9 to 9 to 1 respectively, X and Y are OH and the Mg to Al-Cr ratio is about 1 to 2.

11. The coprecipitate of claim 1 wherein $M^I$ is a mixture of the metal cations $Co^{++}$ and Mg in an atomic ratio of from about 1 to 9 to about 9 to 1, respectively, $M^{II}$ is aluminum, X and Y are each OH, and the Co-Mg to Al ratio is about 1 to 2.

12. The coprecipitate of claim 1 wherein $M^I$ is Mg, $M^{II}$ is a mixture of the metal cations $Co^{+++}$ and Al in a ratio of between 1 to 9 to 9 to 1 respectively, X and Y are OH and the Mg to Al-Co ratio is about 1 to 2.

13. The coprecipitate of claim 1 wherein $M^I$ is a mixture of the metal cations $Fe^{++}$ and Mg in an atomic ratio of from about 1 to 9 to about 9 to 1, respectively, $M^{II}$ is a mixture of the metal cations $Fe^{+++}$ and aluminum in the atomic ratio of between 1 to 9 and 9 to 1, respectively, X and Y are OH and the Mg-$Fe^{++}$ to Al-$Fe^{+++}$ ratio is about 1 to 2.

14. A sinterable spinel comprised of the coprecipitate of any one of claims 1-3 and 4-13 which has been heated to between about 300° and about 1200° C.

15. A sinterable spinel comprised of the coprecipitate of any one of claims 1-3 and 4-13 which has been heated to between about 300° and about 1200° C. following washing with water or an alkaline solution, recovery of the precipitate and drying prior to heating.

16. A spinel having a density equal to or greater than 90% of the theoretical density of the spinel comprised of the product of claim 14, sintered to about 1500° C. or greater.

17. A spinel having a density equal to or greater than 90% of the theoretical density of the spinel comprised of the product of claim 15, sintered to about 1,500° C. or greater.

18. A coprecipitate comprised of a substantially layered crystallite having the structure $$\genfrac{}{}{0pt}{}{M^{II}Y}{\genfrac{}{}{0pt}{}{M^IX}{M^{II}Y}} = (1 + z)M^IX \cdot 2M^{II}Y$$

wherein $M^I$ represents a cation of a metal or mixture of cations of metals having a valence of 1 or 2, and is selected from the group Li, $Fe^{++}$, Mg, $Co^{++}$, Ni and Zn; $M^{II}$ represents a cation of a metal or mixture of cations of metals having a valence of 3 and is selected from the group consisting of Al, $Fe^{+++}$, $Cr^{+++}$ and $Co^{+++}$; X and Y are anions selected from the group consisting of hydroxyl, halogen, sulfate, hydroxycarbonate, chlorohydroxide, dihydrogen phosphate, hydrogen phosphate, nitrate, carbonate, carboxylates and their halogenated derivatives, bicarbonate or mixtures thereof; z equals or is greater than zero but less than 3, and sufficient segregated phase of $M^{II}.O.Y$ and/or $M^{II}Y$ to produce an overall stoichiometry of $M^{II}Y$ and $M^IX$ in the ratio of 1.8 to 1 to 2:2 to 1, prepared by coprecipitating from solution the dissolved $M^IX$ and $M^{II}Y$ at the lowest pH of the solution at which precipitation will occur for the desired components respectively at between about 20° C. and 100° C.

19. The spinel prepared by washing the precipitate of claim 18 with a caustic solution, drying the so washed precipitate and thereafter heating the so washed and dried precipitate to between 400° C. and about 1,400° C. thereby to convert the precipitate from $M^IX.2M^{II}Y$ to a dry powder having the formula $$M^IM^{II}_2O_4 + (0\text{-}20 \text{ mole } \%) \text{ segregated phase(s)}.$$

20. The densified spinel prepared by heating the spinel of claim 19 to above about 1,500° C. for a time sufficient to increase the density thereof to from about 90 to 99% of the theoretical density for such spinel.

21. A method for preparing a coprecipitate comprised of a substantially layered crystalite having the structure $$\genfrac{}{}{0pt}{}{M^{II}Y}{\genfrac{}{}{0pt}{}{M^IX}{M^{II}Y}} = (1 + z)M^IX \cdot 2M^{II}Y$$

wherein $M^I$ represents a cation of a metal or mixture of cations of metals having a valence of 1 or 2, and is selected from the group Li, $Fe^{++}$, Mg, $Co^{++}$, Ni and Zn; $M^{II}$ represents a cation of a metal or mixture of cations of metals having a valence of 3 and is selected from the group consisting of Al, $Fe^{+++}$, $Cr^{+++}$ and $Co^{+++}$; X and Y are anions selected from the group consisting of hydroxyl, halogen, sulfate, chlorohydroxide, hydrogen and dihydrogen phosphate, nitrate, carboxylates and their halogenated derivatives, carbonate, bicarbonate or mixtures thereof; z equals or is greater than zero but less than 3, and sufficient segregated phase of $M^{II}.O.Y$ and/or $M^{II}Y$ to produce an overall stoichiometry of $M^{II}Y$ and $M^IX$ in the ratio of 1.8 to 1 to 2:2 to 1, which comprises coprecipitating from solution the dissolved $M^IX$ and $M^{II}Y$ at the lowest ph of the solution at which precipitation will occur for all components respectively at between about 20° C. and 100° C., treating by washing the mother liquor and the precipitate with water or an alkaline solution, separating the precipitate from its mother liquor, washing the so treated precipitate, and drying the precipitate.

22. A method for preparing a dry spinel powder capable of densification under heat which comprises calcining the product of claim 21 at a temperature of from about 300° C. to about 1,200° C. thereby to produce a spinel of the structure $M^IM_2^{II}O_4$ of a density less than theoretical.

23. A method for preparing a dense spinel which comprises heating the product of claim 22 to about 1,500° C. with or without first pressing it.

24. A method for preparing ceramic shapes which comprises compressing the product of claim 22 under about 5,000 to 50,000 psig to the desired shape and heating the so shaped article at above about 1,500° C. for from 5 minutes to 100 hours.

25. A method for preparing a catalyst carrier which comprises shaping the product of claim 22 or claim 26 with or without binders which may be etchable, combustable, meltable, or vaporizable, said shaping being done under pressure, and firing said shaped article at above about 1,500° C., and washing, etching and/or vaporizing said additive if any remains therein, to produce a highly porous shaped article of said spinel, said particles being highly densified and joined to each other.

* * * * *